United States Patent
Mitchell

(10) Patent No.: US 10,937,220 B2
(45) Date of Patent: Mar. 2, 2021

(54) ANIMATION STREAMING FOR MEDIA INTERACTION

(71) Applicant: Disney Enterprises, Inc., Burbank, CA (US)

(72) Inventor: Kenneth J. Mitchell, Glendale, CA (US)

(73) Assignee: Disney Enterprises, Inc., Burbank, CA (US)

(*) Notice: Subject to any disclaimer, the term of this patent is extended or adjusted under 35 U.S.C. 154(b) by 17 days.

(21) Appl. No.: 16/391,137

(22) Filed: Apr. 22, 2019

(65) Prior Publication Data

US 2020/0334886 A1    Oct. 22, 2020

(51) Int. Cl.
*G06T 13/40* (2011.01)
*A63F 13/358* (2014.01)
*A63F 13/355* (2014.01)

(52) U.S. Cl.
CPC ............ *G06T 13/40* (2013.01); *A63F 13/355* (2014.09); *A63F 13/358* (2014.09); *A63F 2300/534* (2013.01)

(58) Field of Classification Search
CPC .................................................. H04L 63/0823
See application file for complete search history.

(56) References Cited

U.S. PATENT DOCUMENTS

| | | | |
|---|---|---|---|
| 6,714,200 B1 * | 3/2004 | Talnykin | G06T 13/20 345/473 |
| 8,086,464 B2 | 12/2011 | Cosatto et al. | |
| 8,868,927 B1 * | 10/2014 | Lee | G06F 21/83 713/189 |
| 9,679,075 B1 * | 6/2017 | Kolam | G06F 16/957 |
| 9,717,982 B2 | 8/2017 | Quinn et al. | |
| 10,008,034 B2 | 6/2018 | McGuire et al. | |

(Continued)

FOREIGN PATENT DOCUMENTS

WO    2017139871 A1    8/2017

OTHER PUBLICATIONS

Kevin Boos, David Chu, Eduardo Cuervo, "FlashBack: Immersive Virtual Reality on Mobile Devices via Rendering Memoization," Jun. 25-30, 2016, Rice University, Microsoft Research, 13 pages.

(Continued)

*Primary Examiner* — Jitesh Patel
(74) *Attorney, Agent, or Firm* — Patterson + Sheridan, LLP

(57) ABSTRACT

Embodiments provide for animation streaming for media interaction by receiving, at a generator, inputs from a target device presenting of a virtual environment; updating, based on the user inputs, a model of the virtual environment; determining network conditions between the generator and target device; generating a packet that includes a forecasted animation set for a virtual object in the updated model that comprises rig updates for the virtual object for at least two different states, and a number of states included in the packet is based on the network conditions; and streaming the packet to the target device, where the target device: receives a second input to interact with the virtual environment that changes the virtual environment to a given state; selects and applies a rig update associated with the given state a local model of the virtual object; and outputs the updated local model on the target device.

18 Claims, 8 Drawing Sheets

(56) References Cited

U.S. PATENT DOCUMENTS

| | | | | |
|---|---|---|---|---|
| 2010/0070859 | A1* | 3/2010 | Shuster | A63F 13/79 |
| | | | | 715/706 |
| 2011/0302293 | A1* | 12/2011 | Buban | H04L 67/06 |
| | | | | 709/224 |
| 2013/0342572 | A1* | 12/2013 | Poulos | G06F 3/012 |
| | | | | 345/633 |
| 2014/0267429 | A1* | 9/2014 | Justice | G09G 5/006 |
| | | | | 345/649 |
| 2014/0274370 | A1* | 9/2014 | Shah | A63F 13/22 |
| | | | | 463/31 |
| 2014/0375634 | A1 | 12/2014 | Hillesland et al. | |

OTHER PUBLICATIONS

Cai et al, "Toward Gaming as a Service," Published by the IEEE Computer Society, 2014, 7 pages.

Dean Takahashi, "How Hatch aims to transform the way you play mobile games," Feb. 12, 2017, Venture Beat, 5 pages.

Chris Monis, "Streaming Could Change the Video Game Business Forever," Aug. 26, 2018, 2 pages, Fortune.

Crassin et al, "Cloudlight: A System for Amortizing Indirect Lighting in Real-Time Rendering," Journal of Computer Graphics Techniques, vol. 4, No. 4, 2015, 27 pages.

Richard Laing. 1974. Maxwell's Demon and Computation. Philosophy of Science 41, 2 (1974), 171-178 (Abstract Only).

J. M. P. van Waveren. 2016. The Asynchronous Time Warp for Virtual Reality on Consumer Hardware. In Proceedings of the 22nd ACM Conference on Virtual Reality Software and Technology (VRST '16). ACM, New York, NY, USA, 37-46.

Vicon Motion Systems. 2013. Vicon DataStream SDK Developer's Manual. (2013), 5 pages. <https://docs.vicon.com/display/DSSDK18/DataStream+SDK+Documentation> (Abstract Only).

* cited by examiner

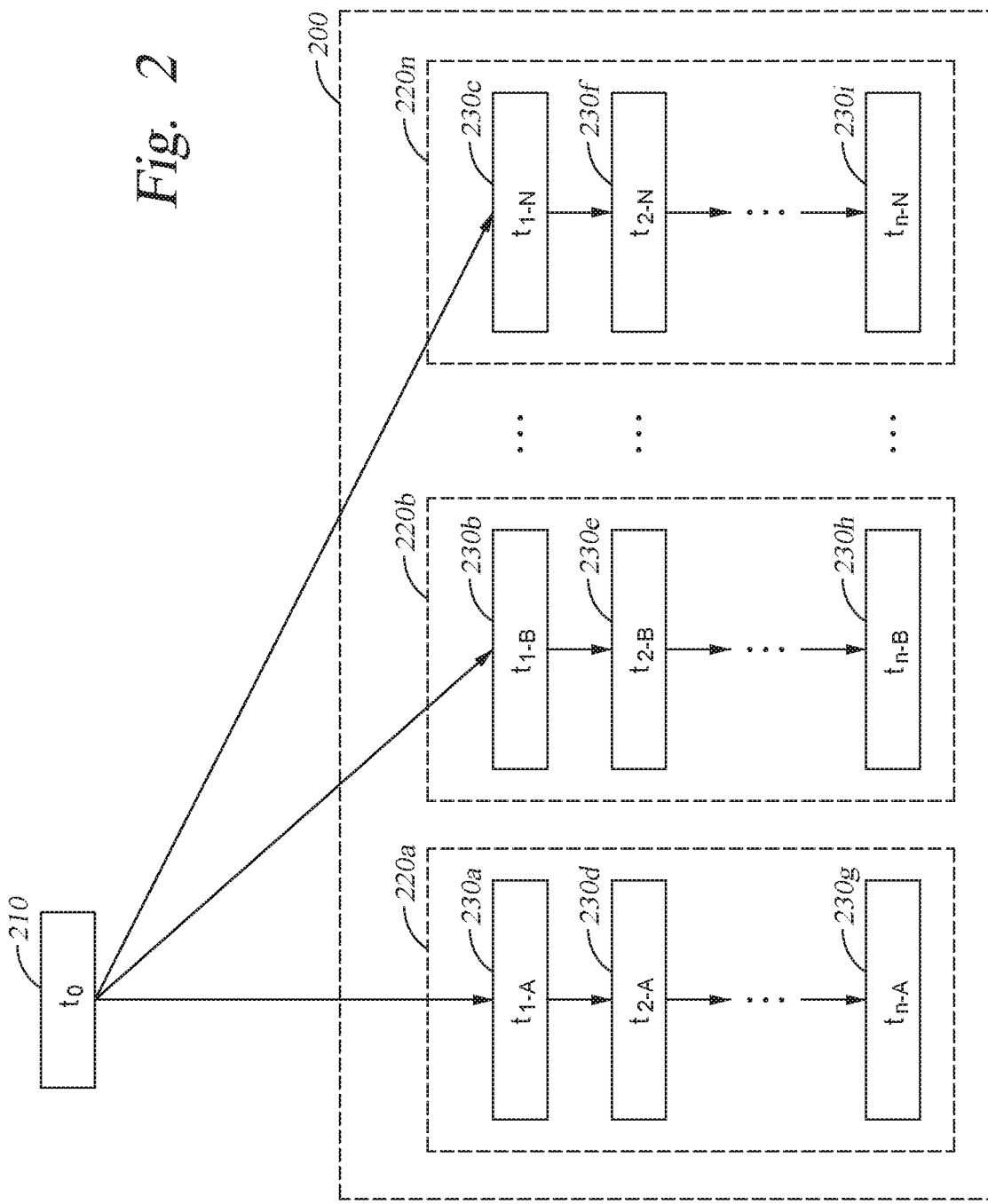

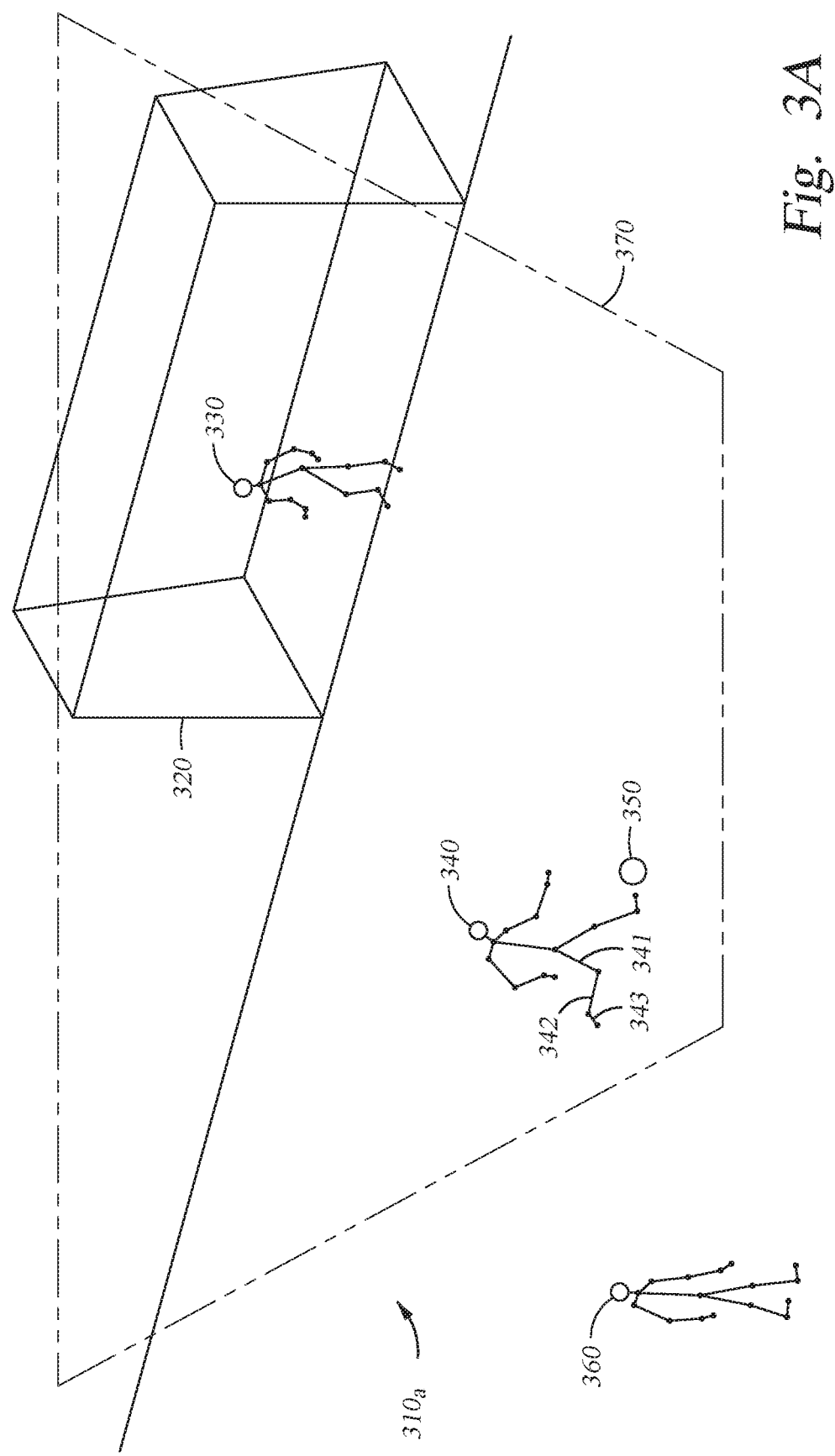

ANIMATION STREAMING FOR MEDIA INTERACTION

BACKGROUND

The animation of immersive content, such as virtual objects in a video game, Augmented Reality (AR) application, Virtual Reality (VR) application, or other context includes providing a sequence of images for display to a user. When animated, consecutive images of the virtual objects provide changes in the appearance and/or position of the virtual objects in which the virtual objects may be repositioned within an environment (either a purely virtual environment or a virtual environment mapped to a real-world environment), modeled in a different pose, affected by changing lighting/texturing conditions, or moved into/out of a frame of view for the user. Users increasingly desire that the animations be provided at a consistent rate between the various animated virtual objects, at a steady rate of animation (e.g., avoiding jitter in animating the virtual objects), a high rate of refresh (e.g., at least X Frames per Second (FPS)), and at a high level of graphical detail.

SUMMARY

The present disclosure, in one embodiment, provides a method of animation streaming for media interaction, comprising: receiving, at a generator, user inputs from a target device displaying a presentation of a virtual environment; updating, at the generator based on the user inputs, an environmental model of the virtual environment; determining network conditions between the generator and the target device; generating a packet that includes a forecasted animation set for a virtual object in the updated environmental model, wherein the forecasted animation set comprises a plurality of rig updates for the virtual object for at least two different states of the environmental model, and a number of states comprising the at least two states is based on the network conditions; and streaming the packet to the target device.

The present disclosure, in one embodiment, provides a method of animation streaming for media interaction, comprising: receiving, at a target device displaying a virtual environment, a packet stream from a remote generating device, wherein each packet in the packet stream includes a forecasted animation set for a virtual object included in the virtual environment, wherein the forecasted animation set comprises a first rig update for a first state of the virtual environment at a subsequent time and a second rig update for a second state of the virtual environment at the subsequent time; receiving, at the target device, a user input to interact with the virtual environment that changes the virtual environment to a given state of the first state and the second state; selecting a given rig update from the packet stream associated with the given state; applying the given rig update for the virtual object to a local model of the virtual object displayed by the target device; outputting, for the subsequent time, the local model on the target device according to the given rig update; and transmitting the user input to the remote generating device.

The present disclosure, in one embodiment, provides a system for animation streaming for media interaction, comprising: a generating device, including a generating processor and a generating memory including generating instructions that when performed by the generating processor enable the generating device to perform an animation operation comprising: generating a plurality of packets, wherein each packet of the plurality of packets includes a forecasted animation set for a virtual object, wherein the forecasted animation set comprises a plurality of rig updates for the virtual object for at least two different states of a virtual environment for one time; adjusting a number of rig updates in the forecasted animation set of a given packet based on at least one of a latency and an available bandwidth of a network over which the plurality of packets are streamed; and streaming the plurality of packets via the network; and a target device, in communication with the generating device via the network, the target device including a target processor and a target memory including target instructions that when performed by the target processor enable the target device to perform an operation comprising: displaying a local model of the virtual environment that includes the virtual object; receiving the plurality of packets streamed from the generating device; receiving a user input to interact with the virtual environment; transmitting the user input to the generating device; selecting, based on the user input, a given rig update from the plurality of packets received from the generating device; and updating the local model according to the given rig update for the virtual object.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 2 illustrates a packet, as may be part of a series or stream of packets transmitted between a generating device and a target device, according to embodiments of the present disclosure.

FIGS. 3A-3D illustrate various states of a virtual environment, according to embodiments of the present disclosure.

DETAILED DESCRIPTION

Figure 1:
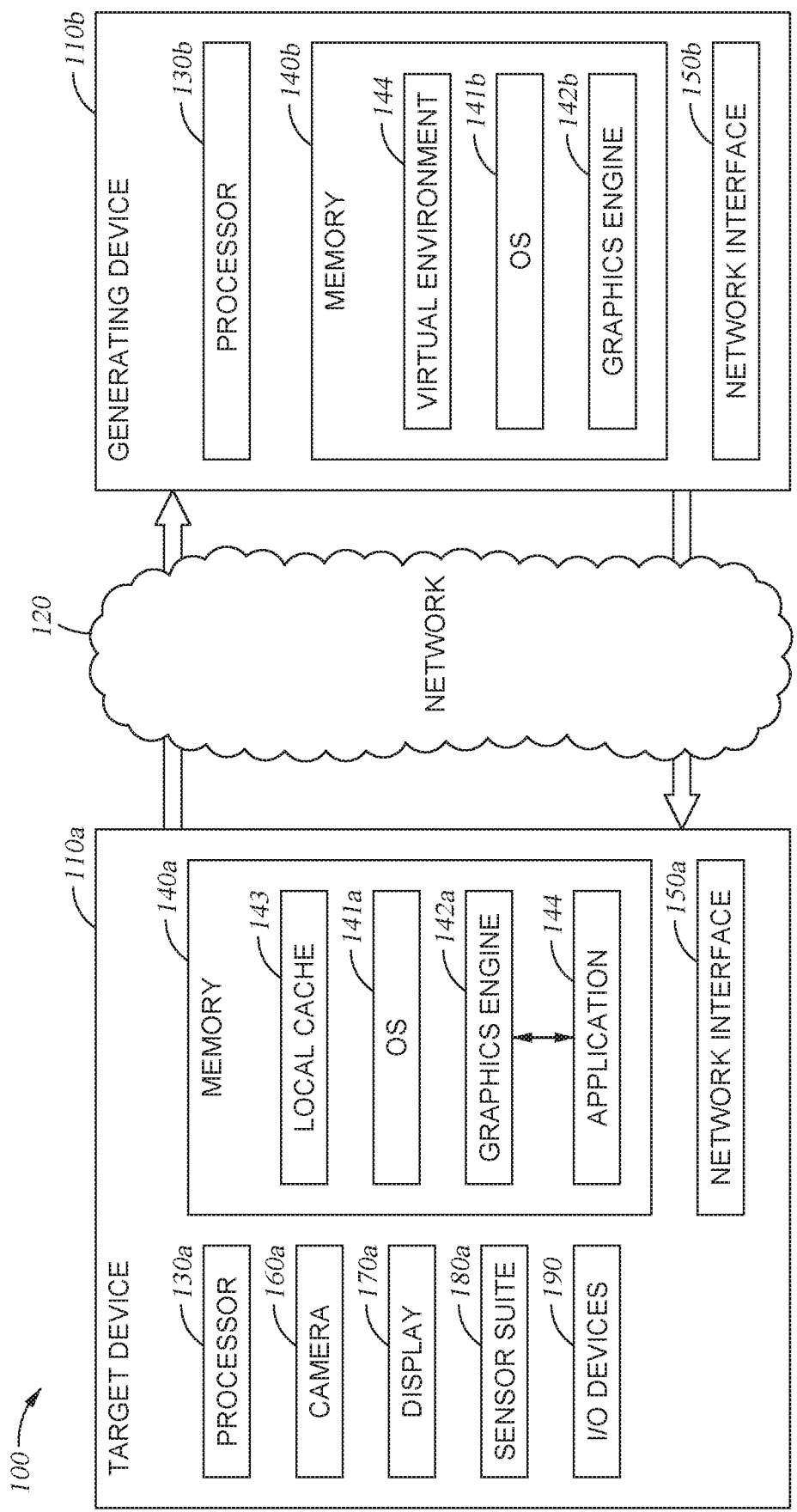
FIG. 1 illustrates a computing environment for animation streaming for media interaction, according to embodiments of the present disclosure.

One strategy for providing high quality animation is to use a generating device to generate a series of images including virtual objects and transmit the results to a separate target device. The target devices process the results received from the generating device to display the animation and/or allow interaction with the animation. By allowing a generating device to generate the animation, the target device may devote processing and storage resources to other tasks, use hardware and software with less complexity than that used in the generating device, and conserve power, among other benefits. However, when using separate generating and target devices, the transmission of the results from the generating device to the target device may be bandwidth intensive, which can lower the quality of the animation on the target device in bandwidth limited spaces. Additionally, in high latency spaces, user interactions with the animation (e.g., user inputs in a video game, user motion in the environment an Augmented Reality (AR)) may outpace the delivery of related animations; introducing unwanted stutter or blurring/jumping into the animation of the virtual environment on the target device.

The present disclosure provides for improvements in a distributed animation environment in which a first device processes an animation that is provided to a target device for further processing. The improvements provided in the present disclosure may be particularly noticeable in environments in which bandwidth for transmission between the separate devices is limited, latency between the separate devices is high, or the generating engines on the separate devices are different. Data are streamed from a source device to a target device (which may be a subsequent source device for a subsequent target device), which include a reduced set of animation data. The target device processes the data stream relative to a cached dataset to affect a final animation, which may be output to a human user to interact with or transmitted to a subsequent target device for post-processing. The terminal target device, in turn, transmits a reduced set of interaction data to an initial generating device (in some embodiments via the intermediary generating/target devices). The initial generating device processes the interaction data to update a model of the virtual environment that includes the virtual objects being animated, and transmits the updates to the virtual environment to the target device(s).

The data transmitted between the separate devices may be compressed and/or optimized to reduce the amount of data transmitted for an individual animation, so that more animations can be provided for a given bandwidth availability between the separate devices. For example, the information included in a given packet may be bitwise compressed, and the information that is included may be selected to represent a change (also referred to as a delta) between the current state and a subsequent state of the virtual environment and omit data related to static objects or objects outside of the Field of View (FOV) or Potentially Visible Set (PVS) for the target device.

FIG. 1 illustrates a computing environment 100 for animation streaming for media interaction. A target device 110a and a generating device 110b (also referred to as a generator) are examples of computing devices (generally, computing device 110) in communication with one another over a network 120. In various embodiments, the network 120 may be a wireless local area network, a wireline local area network, the internet, or another distributed packet switched network. In some embodiments, the target device 110a is a display device for an AR system and the generating device 110b is a personal computer or a cloud server linked to the target device 110a to provide additional processing power for providing an AR experience.

Each of the computing devices 110 includes a respective processor 130 (target processor 130a and generator processor 130b), memory 140 (target memory 140a and generator memory 140b), and network interface 150 (target network interface 150a and generator network interface 150b). The processor 130 and the memory 140 provide computing functionality to the respective computing device 110. The memory 140 may be one or more memory devices, such as, for example, Random Access Memory (RAM), Read Only Memory (ROM), flash memory, or any other type of volatile or non-volatile storage medium that includes instructions that the processor 130 may execute. The processor 130 may be any computer processor capable of performing the functions described herein. The network interfaces 150 provide wireline and/or wireless communications for the computing devices 110 over the network 120. In various embodiments, the network interfaces 150 are radio transmitters/receivers, which receive signals from external sources and transmit signals to external devices. The network interfaces 150 may be in communication with various antennas and may configure messages to be transmitted or received according to various standards, such as, Bluetooth, Wi-Fi, or a proprietary standard.

The memories 140 generally include program code for performing various functions related to image processing and media interaction. The program code is generally described as various functional "applications" or "modules" within a memory 140, although alternate implementations may have different functions and/or combinations of functions. The memories 140 also generally include data structures that may store information for use by the various program code modules also stored thereon. Each of the memories 140 include an Operation System (OS) 141 (target OS 141a and generator OS 141b), which may be the same or different on the target device 110a and the generating device 110b in various embodiments. Similarly, each of the memories 140 include a graphics engine 142 (target graphics engine 142a and generator graphics engine 142b), which may be the same or different engine in various embodiments. For example, the target device 110a may use one of CRYENGINE®, UNITY®, UNREAL ENGINE®, etc., (available respectively from Crytek IP Holding LLC of Delaware, Unity IPR ApS of Denmark, and Epic Games Inc. of Maryland) as the target graphics engine 142a, while the generating device 110b uses a different or the same engine from those selected by the target device 110a.

The target memory 140a includes an application 144a that uses the target graphics engine 142a to display a virtual environmental in association with user inputs. In various embodiments, the application 144a may be an AR application (e.g., a game, edutainment application, navigation application, control interface, etc. using a virtual environment mapped to a physical environment in which the target device is located) or a Virtual Reality (VR) application (e.g., a game, edutainment application, control interface, etc. that uses a virtual environment independently of the physical environment in which the target device 110a is located). Various virtual objects are included in the virtual environmental that are defined according to skeletal rigs (generally, a rig).

A skeletal rig may include several sub-components and/or joints of a virtual object that define the relative positions and orientations of parts of the virtual object. For example, a rig of a virtual object of a person may include several sub-components corresponding to the various bones/joints of the arms and legs and torso of a person, but may be simplified from the skeleton of a real-world person (e.g., including a forearm component in the rig rather than a radius and ulna as in a skeleton). In another example, a virtual object may include several sub-components corresponding to programmatically defined bend-points that are not related to a real-world equivalent (e.g., a trunk of a virtual elephant may include several rig components/joints despite real-world elephant trunks lacking bones). In a further example, a virtual object, such as a ball, a sign, a building, etc., that is programmatically defined without actuation/bend points may include a single or multiple rig elements and exclude or fix in position any joints therebetween.

As used herein, a "rig update" may refer to various changes in pose parameters for a virtual object, including deformations, rig bone realignments, blend shape activations, etc.

The generator memory 140b includes a model of the virtual environment 145 that includes one or more states of the virtual environment 145 and the virtual objects therein. The virtual objects are modeled in various states across time in the virtual environment, moving from positions between the different states. When a virtual object moves from a first position to a second position, one or more of the rig components are adjusted to new positions. For example, a virtual object of a person may have rig components related to an arm moved to new positions (and other rig components remain static) to perform a "waving" operation. The updates to the rig of a virtual object are calculated at the generating device 110b in the virtual environment 145, and transmitted to the target device 110a as one or more rig updates that represent one or more different states of the virtual environment 145. Several rig updates may be chained together across time to thus produce an animation of the virtual object. For example, a first animation set may include a series of rig updates related to the virtual person moving an arm back and forth in the air above the virtual person's head to produce a waving animation, while a second animation set may include a series of rig updates related to the virtual person jumping up and down.

In some embodiments, the generating device 110b models the virtual objects with a more complex skeletal rig than is indicated in the updates transmitted to the target device 110a. For example, consider a skeletal rig of a person that is generated and updated on the generating device 110b, which may include joints for the person's ankle and foot to match the contours of the ground in the virtual environment 145 that the person is modeled to be standing on (e.g., flexing the foot upward when placed uphill, pronating the foot when placed downhill). The generating device 110b may omit transmitting the rig updates that affect how the foot is positioned relative to the ground when the target device 110a uses a simpler model for that virtual object (e.g., omitting the ankle joint on the target device 110a), the network conditions between the target device 110a and generating device 110b have bandwidth below a given threshold (e.g., prioritizing update transmission for larger or prioritized joints, such as knees or hips, over the ankle joint), and/or the affected joint is outside of a field of view on the target device 110a.

The application 144a and/or the target graphics engine 142a receives rig updates from the generating device 110b, and selects rig updates from one animation set to update the virtual objects in the local model of the environment. The application 144a may select a given animation set based on a user input (e.g., a selection to wave results in the first animation set described above being selected, and an input selection of jumping results in the second animated set described above being selected). Once updated, the target device 110a applies various textures and meshes to rigs of the virtual objects in the environmental model that are visible to the user and outputs the environmental model (e.g., via a display device 170a to a user or to another target device). The various textures, geometries, material meshes, and lighting information may be stored in a local cache 143a, which can be updated to reflect changes in lighting conditions and the external appearance of the virtual objects. In some embodiments, the generating device 110b includes updates to the textures, geometries, material meshes, and lighting information for the target device 110a to update the local cache 143a based on conditions in the virtual environment 145 determined on the generating device 110b. Such updates to the virtual cache 143a may be included with a rig update (when bandwidth is available) or may be provided in a loading or initialization phase for a scene to be animated on the target device 110a.

One or more cameras 160a may be included in the target device 110a to provide a video feed of a physical environment to be used in conjunction or overlaid with a virtual environment as part of an AR experience. The camera 160a may be included in the target device 110a by wired or wireless communications so that the image application 144 may use cameras 160a providing several perspectives. A camera 160a may include one or more visual cameras (to produce a two or three dimensional view of the physical environment) as well as one or more range finders to identify distances to various objects within the physical environment.

A display 170a in the target device 110a includes one or more devices used to output virtual objects and/or a video feed to a user. In one example, a Liquid Crystal Display (LCD), Light Emitting Diode (LED), or other display technology is used to present a video feed into which virtual objects have been programmatically inserted or overlaid for output to the viewer. In a further example, two displays 170a are provided, one for each eye of a user, such that the viewer is provided three-dimensional virtual objects in the field of view. In some embodiments, the display 170a blocks a user from viewing some or all of the physical environment in favor of a view of a virtual environment, while in other embodiments the display 170b is translucent or transparent to provide a view of the virtual environment in conjunction with a view of the physical environment.

A sensor suite 180a in the target device 110a may include one or more of a magnetometer, an accelerometer, a gyroscope, and a global positioning system receiver, among other sensors. The sensor suite 180 may include additional sensors, several instances of each sensor, or may omit some of the example sensors discussed herein. A magnetometer is a sensor that provides a bearing to a north pole of a magnetic field in the environment in which the target device 110a is present. The magnetometer may thus provide the target device 110a with a directional sense in terms of yaw orientation with respect to magnetic north. The accelerometer, which measures acceleration forces acting on the target device 110a, may provide the target device 110a with information of whether the target device 110a (or a portion thereof) is moving, and in which direction(s). The gyroscope measures orientation of the target device 110a (or a portion thereof), and may provide the target device 110a with information of whether the target device 110a (or portion thereof) is level or to what degree the target device 110a is tilted in one or more planes. The combination of the accelerometer and gyroscope may thus provide the target device 110a with a directional sense in terms of pitch and roll with respect to gravity. The positioning system may provide absolute positioning information (e.g., via a Global Positioning System (GPS) receiver) and relative positioning information (e.g., via a range finder, a camera sensor including image recognition software to identify objects and distances thereto based on known sizes). In some embodiments, the application 144a uses the sensor suite to determine where the target device 110a is located on an existing environmental map, and to provide user input related to where the target device 110a is facing and positioned in a physical environment.

Additional Input/Output (I/O) devices 190 may be included in various embodiments of target device 110*a*. The additional I/O devices 190 may include various lights, displays, and speakers (e.g. LEDs, IR transmitter/receivers, speaker, buttons, microphones, light sensors, etc.) for providing output from the target device 110*a*. For example, a speaker is an I/O device 190 that provides audio output (e.g., of an audio component of a video feed). The additional I/O devices 190 may include physical joysticks, physical steering wheels/yokes, physical buttons, physical switches, microphones, and a touch interface that designates various regions for use as virtual joysticks, buttons, switches, etc. A user may manipulate the various additional I/O devices 190 to interact with the application 144, signal target device 110*a* to turn on or shut down, alter a mode of operation, switch to a different application, change system settings (e.g., volume, brightness), etc.

FIG. 2 illustrates a packet 200, as may be part of a series or stream of packets transmitted between a generating device 110*b* and a target device 110*a*, according to embodiments of the present disclosure. A generating device 110*b* may stream a series of packets 200 to the target device 110*a* over a period of time, which may include various header information (e.g., routing information), footer information (e.g., a checksum), a ground state 210 and a forecasted animation set with one or more sets of branching states 220*a-n* (generally, branching state 220) from the ground state 210 that forecast in time different changes to the virtual environment 145 and views of the virtual environment 145. Each branching state 220 includes one or more predictive states 230*a-i* (generally, predictive state 230) that describe a window into a potentially different local state/view of the virtual environment 145 from a prior state, and that offer a different state of the virtual environment 145 than described in a different branching state 220. Stated differently, each branching state 220 describes one Potentially Accessible State (PAS) that the target device 110*a* may select between based on user input to animate a chosen course of action in the virtual environment 145, and the set of branching states 220*a-n* provided in the packet 200 give the target device 110*a* several options for how the scene may play out locally.

For example, based on a shared ground state 210 of the virtual environment 145 for time $t_0$, a first branching state 220*a* includes a first predictive state 230*a* of the virtual environment 145 at time $t_1$, while a second branching state 220*b* includes a second predictive state 230*b* of the virtual environment 145 at time $t_1$, and an nth branching state 220*n* includes a third predictive state 230*c* of the virtual environment 145 at time $t_1$, etc. Each branching state 220 may include further predictive states 230 that are based on earlier predictive states 230 within the branching state 220. Stated differently, each branching state 220 branches from the shared ground state 210 to describe at least one predicted path, and each predictive state 230 may in turn be a ground state 210 for one or more subsequent branching states 220. For example, a fourth predictive state 230*d* of the environment at time $t_2$ may be based on the first predictive state 230*a* of the environment at time $t_1$, whereas a fifth predictive state 230*e* of the virtual environment at time $t_2$ may be based on the second predictive state 230*b* of the virtual environment 145 at time $t_1$.

Each branching state 220 provides a branching option from the ground state 210 for the target device 110*a* to choose between when animating virtual objects. The generating device 110*b* transmits the forecasted animation sets in anticipation of the target device 110*a* advancing to the time (or times) forecasted in the predictive states 230. A user input at the target device 110*a* may be used to select one of the branching states 220, which the target device 110*a* uses to update the output of the application 144. The target device 110*a*, in turn, transmits the user input to the generating device 110*b*, so that the generating device 110*b* updates the ground state 210 to match state of the application 144 at the target device 110*a*.

For example, at time $t_0$ the ground state 210 may indicate that a player character and a Non-Player Character (NPC) engaged in a game of rock-paper-scissors are counting down whether to indicate one of rock, paper, or scissors. In anticipation of the player providing user input (i.e., one of rock, paper, or scissors), the generating device 110*b* transmits packet 200 with forecasted animation sets for the NPC selecting, for example, "rock" at time $t_0$ and the three reactions for the NPC at time $t_1$; respective branching states 220 of the NPC winning, the NPC losing, and the NPC drawing based on the inputs from the human player that are unknown to the generating device 110*b* at time $t_0$.

By receiving the animation set with branching states 220 prior to the action taking place, the target device 110*a* can provide smoother animations to a human user than waiting for the user input to be processed and transmitted from the target device 110*a*, received by the generating device 110*b*, processed, and returned to the target device 110*a*. Particularly in network environments in which latency is variable or packet loss is high, having several branching states 220 and predictive states 230 available to the target device 110*a* before the animation is played back can allow the target device 110*a* to select a predictive state 230 from an earlier or later received packet 200 in the stream of packets 200 to continue playback from. For example, when the target device 110*a* receives a first packet 200 with predictive states 230 for times $t_1$, $t_2$, and $t_3$, the target device 110*a* may animate for times $t_1$, $t_2$, and $t_3$ even if other packets 200 that provide for predictive states 230 for times $t_2$, $t_3$, $t_4$, etc. are not received or not received on time. The generating device 110*b* may thus adjust the number of predictive states 230 included in each forecasted animation set to include more predictive states 230 when the network conditions indicate a higher latency compared to the number of predictive states 230 when the network conditions indicate a lower latency.

In some embodiments, when the amount of bandwidth available for communications from the generating device 110*b* to the target device 110*a* increases, the number of predictive states 230 included in the packet 200 increases, whereas when the amount of bandwidth decreases, the number of predictive states 230 included in the packet 200 decreases. The generating device 110*b* may adjust the number of predictive states 230 to include in a given packet 200 by varying the number of branching states 220 to include, the number of future time periods of predictive states 230 to include in each branching state 220, and combinations thereof. In various embodiments, the generating device 110*b* prioritizes which branching states 220 to include in the forecasted animation sets based on a determined likelihood that the user selects a particular branching state 220. For example, when the generating device 110*b* determines that only X branching states 220 are to be included in the packet 200 from branching states 220*a-n*, the X branching states 220 with the highest probability of being selected by the user input are included in the packet 200, and the other branching states 220 are excluded from the packet 200. If, continuing the prior example, X is less than the number of branching states 220, all of the branching states 220 may be included in the packet 200, and the generating device 110*b* may increase the number of predictive states 230 included with some or all of the branching states 220.

To ensure that as many predictive states 230 can be included in a given size of packet 200 as possible, the generating device 110b may perform a bitwise or other compression on the data included in the packet 200. To further reduce the amount of data included in a particular predictive state 230, the generating device 110b may include the rig updates for the various virtual objects determined to be within the Field of View (FOV) of the target device 110a and exclude information related to virtual objects outside of the FOV, and information related to static rig elements (e.g., static virtual objects or static joints within a dynamic virtual object) for those virtual objects within the FOV.

Figure 3B:
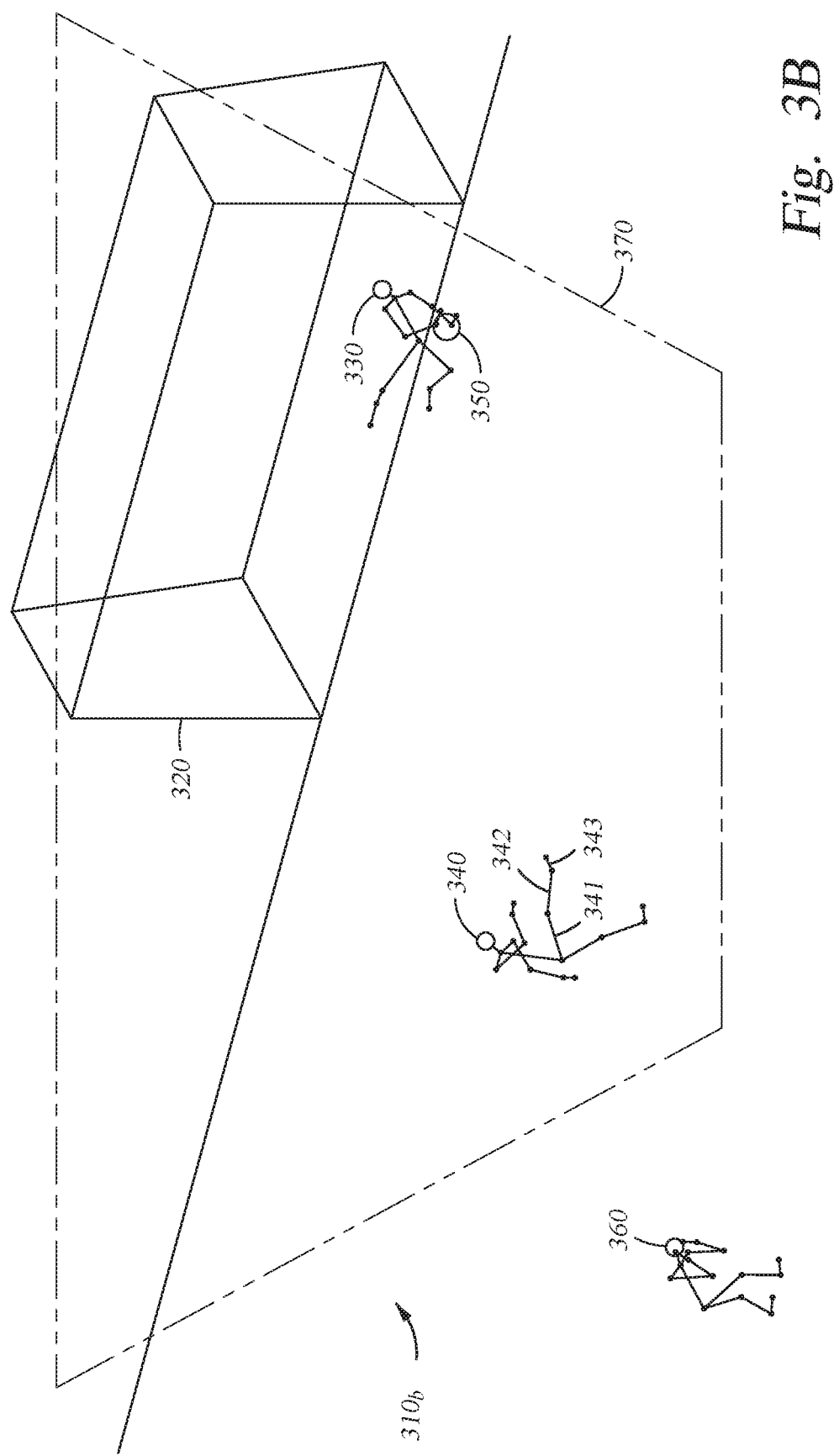
Figure 3C:
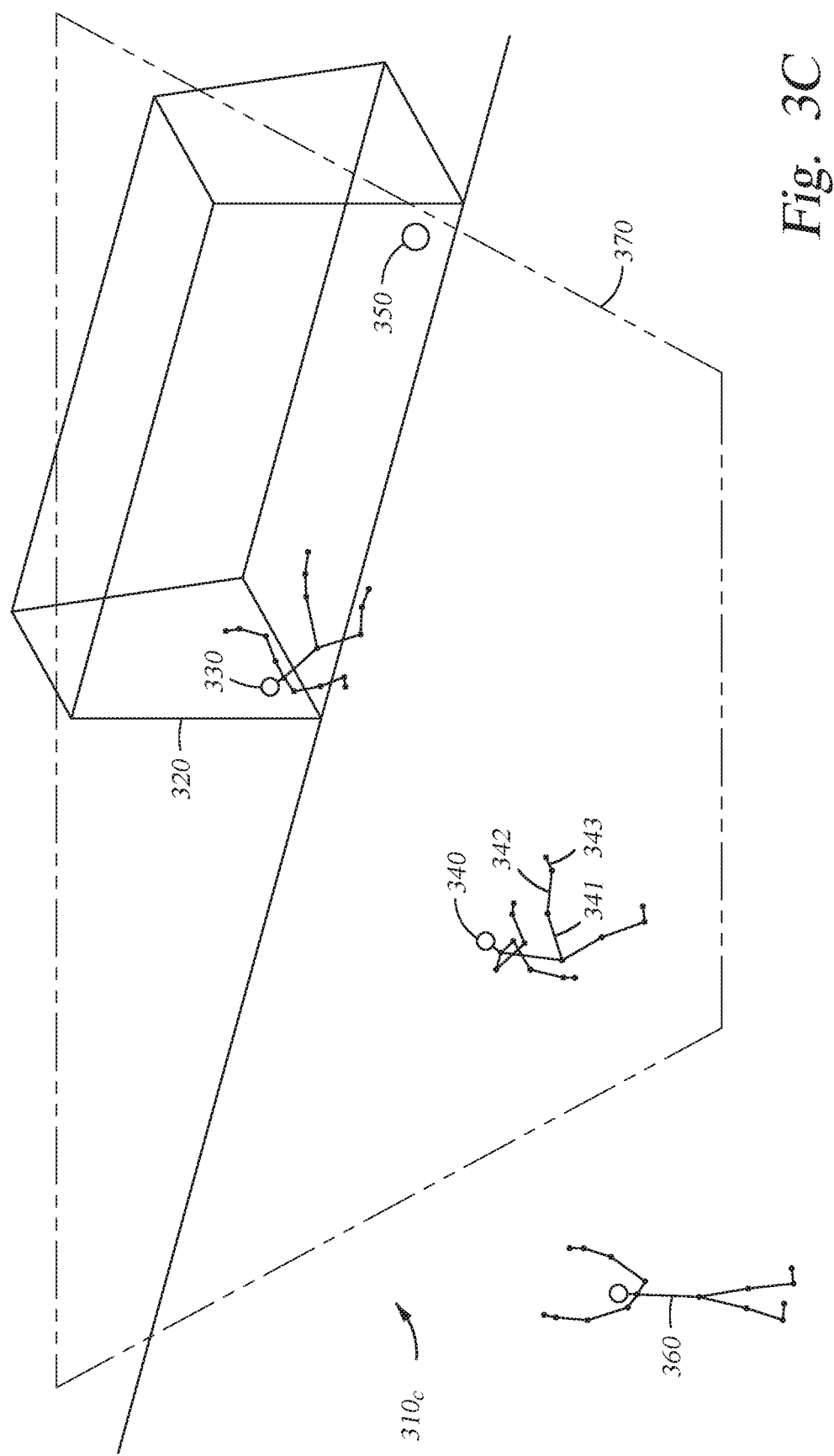
Figure 3D:
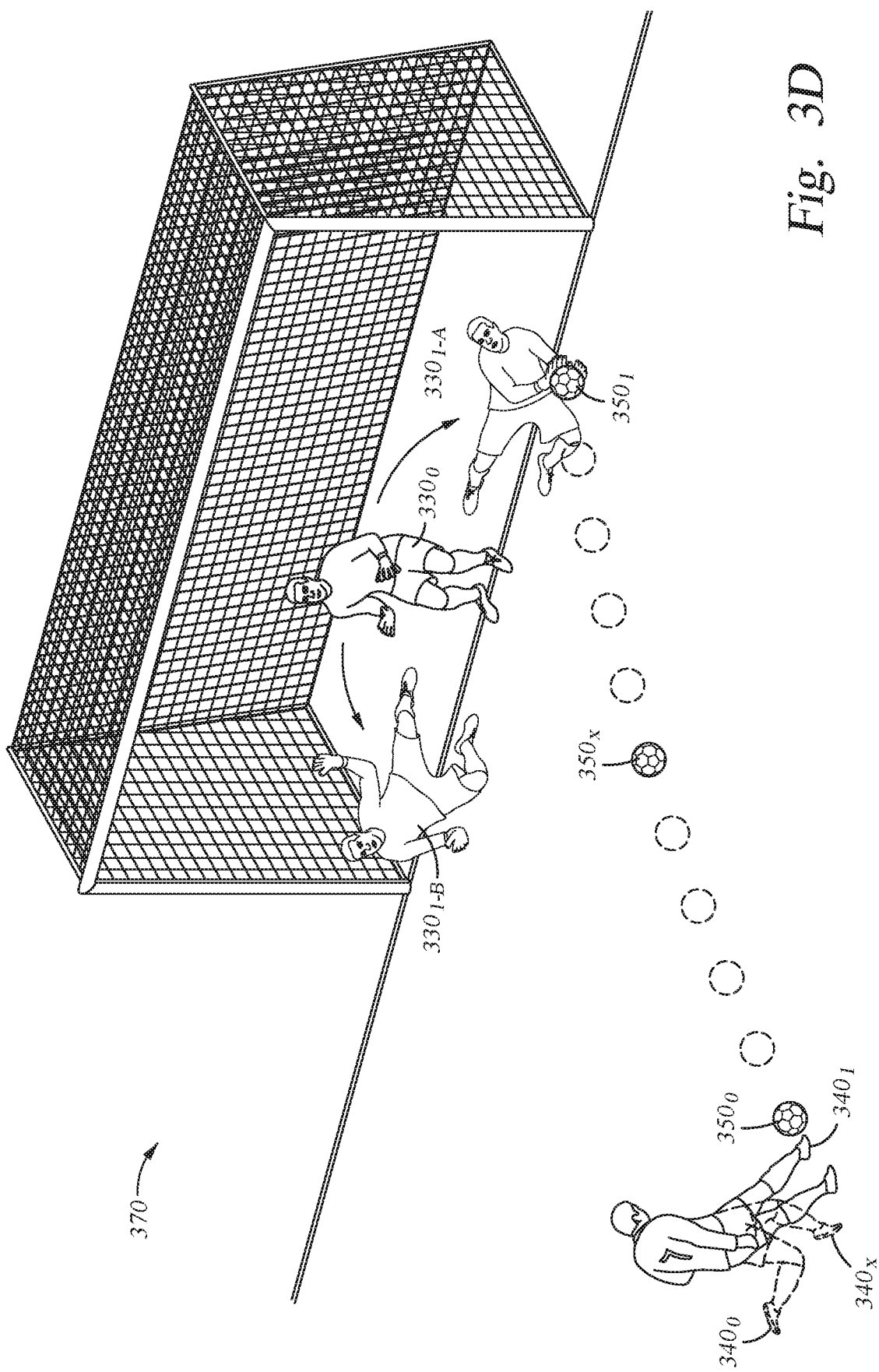

FIGS. 3A-3D illustrate various states of a virtual environment, according to embodiments of the present disclosure. FIG. 3A illustrates a ground state 210 in which several skeletal rigs for virtual objects in a soccer game are shown. FIGS. 3B and 3C illustrate different branching states 220 from the ground state 210 in which the several skeletal rigs for virtual objects in the soccer game are shown reacting to different user inputs. FIG. 3D illustrates an output state of the soccer game as animated according to the rig model updates indicated from the branching states 220.

In the examples illustrated in FIGS. 3A-3D, the generating device 110b tracks a first virtual object 320 of a goal, a second virtual object 330 of a goal keeper, a third virtual object 340 of a forward (or other player attempting to shoot on the goal), a fourth virtual object 350 of a ball, a fifth virtual object 360 of a wing (or other player near the goal), and a FOV 370 for the target device 110a. Each of the virtual objects 320-360 are defined according to a skeletal rig, including one or more "bones" that may be repositioned at different times to animate movement of the virtual objects in the virtual environment 145. As illustrated, the third virtual object 340 includes a first rig bone 341, a second rig bone 342, and a third rig bone 343 that change positions while other rig bones of the third virtual object remain stationary between the illustrated times.

In FIG. 3A, at time $t_0$, the virtual environment 145 exists in a first state 310a, which corresponds to the ground state 210 for a packet 200 generated from $t_0$ onward, but may be a prior state for a packet 200 generated after time $t_0$ (i.e., $t_0+x$) or a predictive state 230 for a packet 200 generated before time $t_0$ (i.e., $t_0-x$).

In FIG. 3B, at time $t_1$, the virtual environment 145 exists in a second state 310b, which corresponds to an initial predictive state 230 of a first branching state 220a. In FIG. 3C, at time $t_1$, the virtual environment 145 exists in a third state 310c, which corresponds to an initial predictive state 230 of a second branching state 220b. The second state 310b and the third state 310c both illustrate a predictive state 230 from the ground state 210 at time $t_1$ in which the forward (virtual object 340) kicks the ball (virtual object 350) to the right side of the goal (virtual object 320). The second state 310b indicates the goal keeper (virtual object 330) jumping to the right side of the goal in response to one potential user command, and catching the ball. In contrast, the third state 310c indicates the goal keeper jumping to the left side of the goal in response to a different potential user command, and allowing the forward to score. Although the second state 310b and the third state 310c are mutually exclusive and associated with different commands, both may be included in a single packet 200 so that the target device 110a can select between which to use when the user inputs the user command locally to the target device 110a without sending the user command to the generating device 110b and waiting for one of the branching states 220 to be returned.

To reduce the bandwidth requirements when transmitting several potential states of the virtual environment 145 to the target device 110a, the generating device 110b generates the packet 200 to include rig updates rather than rig statuses, and may exclude rig updates for virtual objects outside of the FOV 270 for a given time $t_x$. For example, because the position of the skeletal rig of the second virtual object 330 (the goal keeper) and the fourth virtual object 350 (the ball) change from time $t_0$ to time $t_1$, the rig updates in the predictive states 230 for each of the second state 310b and third state 310c include rig updates for the respective virtual objects. In contrast, because the position of the skeletal rig of the first virtual object 320 (the goal) does not change from time $t_0$ to time $t_1$, there are no rig updates to include in the predictive states 230 for each of the second state 310b and third state 310c. Regarding the fifth virtual object 360 (the wing/other player), despite the skeletal rig changing from time $t_0$ to time $t_1$, because the fifth virtual object 360 is outside of the FOV 270 at times $t_0$ and $t_1$, the generating device 110b omits the rig updates from the packets generated for times $t_0$ and $t_1$.

To further reduce the bandwidth requirements when transmitting several potential states of the virtual environment 145 to the target device 110a, the generating device 110b may generate the packet 200 to include rig updates for individual rig components/bones rather than the virtual object as a whole. For example, the forward (virtual object 240) is illustrated in FIGS. 3A-3C as remaining in one position—except for a kicking leg—between time $t_0$ and $t_1$. The generating device 110b may therefore include rig updates for the kicking leg of the forward (first rig bone 341, second rig bone 342, and third rig bone 343) and omit further information regarding the third virtual object 340 from the predictive states 230 for times $t_0$ and $t_1$. In further embodiments, based on the FOV 370, if one virtual object obscures another virtual object (or rig component thereof), the generating device 110b may omit those rig updates from the predictive state 230 sent to the target device 110a as such updates to the virtual environment 145 would not be reflected in a final animated on the target device 110a.

FIG. 3D illustrates the FOV 270 in FIGS. 3A-3C animated. FIG. 3D may represent the animated virtual environment 145 on the generating device 110b or the display provided by the application 144 on the target device 110a. The display of the virtual environment 145 includes the virtual objects as posed in the first state 310a and potential animations from the first state 310a to one of the poses indicated in FIG. 3B or 3C. In FIG. 3D, the skeletal rigs illustrated in FIGS. 3A-3C are overlaid with geometries, material meshes, and textures, to which lighting effects are applied by the graphics engine 142 to produce the displayed versions of the virtual objects. The various object effects (e.g., geometries, material meshes, textures, and lighting) may be applied by the target device 110a via stored values in a local cache 143, so that the packet 200 transmitted from the generating device 110b may omit such information.

In various embodiments, the information transmitted from the generating device 110b to the target device 110a varies in amount and scope depending on network conditions between the two devices 110, but in addition to the skeletal rig information can include light trajectories for global or view-dependent illumination (e.g., surface sampling, multi-bounce light diffusion, ray casting/ray tracing) and particle trajectories for volumetric or particle effects. In some embodiments, the target device 110a caches streamed illumination information for later use, for example, by using local light field RGB-D (Red Green Blue Depth) probes to locally reconstruct lighting conditions.

The branching states 220 for both animation possibilities (the goal keeper jumping towards one direction in the second state 310b or to the opposite direction in the third state 310c) are included in the packet 200 and are thus available to the target device 110a to choose between. Depending on the user input provided by the target device 110a (e.g., a command to jump the goal keeper to the left or the right of the goal), the graphics engine 142 moves the skeletal rigs from the first state 310a to one of the second state 310b and the third state 310c. The target graphics engine 142a may apply various morph weights (which may be specified in the packet 200) to adjust the skeletal rigs and the locally applied effects (e.g., geometries, material meshes, textures, and lighting) and apply in-betweening (tweening) operations to generate intermediate frames that give an appearance of smooth motion of the virtual objects from time $t_0$ and $t_1$ using intermediary positions/poses.

Figure 4:
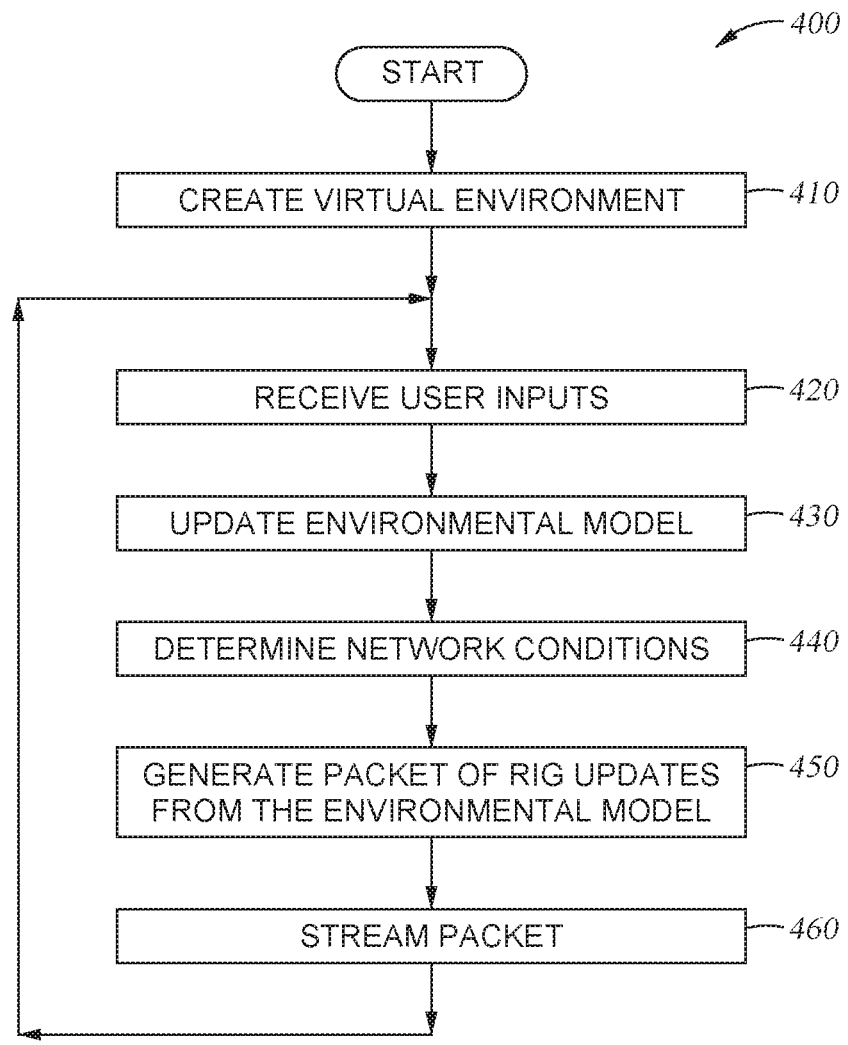
FIG. 4 is a flowchart of a method for animation streaming for media interaction, according to embodiments of the present disclosure

FIG. 4 is a flowchart of a method 400 for animation streaming for media interaction, according to embodiments of the present disclosure. Method 400 begins with block 410, where a generating device 110b creates a virtual environment 145. In various embodiments, the virtual environment 145 is correlated with or mapped to a physical environment (e.g., an AR application/game/service), while in other embodiments the virtual environment 145 is independent of a physical environment (e.g., a non-AR application/game/service). During creation of the virtual environment 145, the generating device 110b may send various assets such as full virtual object rigs, textures, positional data, sound files, logic structures, etc. to a target device 110a to build a local cache 143 and local initial state for the virtual environment 145 as part of a setup or initial loading process.

At block 420, the generating device 110b receives a user input from the target device 110a that changes the state of the virtual environment 145. In some embodiments, the generating device 110b receives the user input in an encrypted format, and decrypts the user input according to an encryption scheme selected to secure communications between the generating device 110b and the target device 110a (e.g., for which the generating device 110b includes the decryption key). The encryption scheme specifies an algorithm or cipher used to encrypt the data, and one or more keys to interpret/decrypt those data. In some embodiments, the user input includes a change in the FOV of the virtual environment 145 that is displayed on the target device. In some embodiments, the user input affects the position of one or more virtual objects (or sub-components thereof). In some embodiments, the user input may indicate station keeping data, and the virtual environment 145 may proceed to update to a next state with user input indicating that no specific user input or change in FOV has occurred. In embodiments using a multi-user virtual environment 145, the generating device 110b may receive user inputs from several target devices 110a that are interacting with the virtual environment 145.

At block 430, the generating device 110b updates the local model of the virtual environment 145 in response to the user input received at block 420. The generating device 110b determines which virtual objects are in the FOV of the target device 110a, and which virtual objects in the FOV have changed positions relative to the viewpoint of the target device 110a.

At block 440, the generating device 110b determines the network conditions on the network 120 between the generating device 110b and the target device 110a. In some embodiments, the target device 110a may report network conditions (such as latency, available bandwidth, dropped packets, coexisting networking demands of the target device 110a) to the generating device 100b along with the user input in block 420. In some embodiment, the generating device 110b determines the network conditions based on pinging the target device 110a.

At block 450, the generating device 110b generates a packet 200 for the target device 110a that includes rig updates for the environmental model local to the target device 110a. In various embodiments, the number of rig updates included in the packet 200 is based on the determined network conditions (per block 440) to provide sufficient rig updates to provide smooth animations on the target device 110a despite the network conditions potentially interfering with or delaying individual packets 200. The generating device 110b generates a forecasted animation set to include in the packet 200 that includes a ground state 210 of the virtual environment 145 as well as one or more branching states 220 of the virtual environment 145 at one or more subsequent times to the time of the ground state 210 as predictive states 230 of the virtual environment 145.

The generating device 110b may use one or more of a Markov chain or various machine learning models to determine which branching states 220 to produce and include in the forecasted animation set, and how many predictive states 230 to include in a given branching state 220. In a multi-user virtual environment 145 (e.g., a VR/AR shared game world, an AR factory setting), the predictive states 230 that the generating device 110b determines to include in the packet 200 may be based on the inputs (or predicted inputs) of one or more users. As latency increases, the generating device 110b may include fewer branching states 220 in a given packet 200, but more predictive states 230 in each branching state 220. Conversely, as latency decreases, the generating device 110b may include more branching states 220 and fewer predictive states 230 in each branching state 220. As bandwidth decreases, the generating device 110b may include fewer branching states 220 and/or fewer predictive states 230. Conversely, as bandwidth increases, the generating device 110b may include more branching states 220 and/or more predictive states 230.

In various embodiments, the generating device 110b translates the rig updates included in the packet 200 based on the model used by the target device 110a. For example, the generating device 110b may model the virtual objects or virtual environment 145 in a different coordinate system than is used by the target device 110a, and translates the generator coordinate system into the target coordinate system when including a rig update in the packet 200. In another example, the generating device 110b may model a virtual object with a more-detailed skeletal rig than is used by the target device 110a, and translates the detailed skeletal rig into the less detailed skeletal rig (e.g., omitting or combining one or more joints). In other embodiments, the generating device 110b includes updates in the packet 200 for one or more assets stored in the local cache 143 to affect textures, geometries, and lighting effects of the virtual objects on the target device 110a.

In embodiments using different graphics engines on the target device 110a and the generating device 110b, for each deformable entity in the scene, the generating device 110b replicates the skeletal rig (composed of blendshapes and skeletal hierarchy along with mesh and material data) in both source and target platform engines. Then, each frame the pose of the entity is retrieved (e.g., in the first engine) as a list of skeleton bone transformations, plus blendshape weight activations. These data are transmitted in a network packet 200 to the target device 110a (e.g., in the second engine) and these bone and shape values are injected into the target rig's frame pose. As will be appreciated, when using different animation system architectures, each bone of the skeleton can be imported in a different order between these engines, so a mapping table is generated such that the transmitted bone ordering can be resolved into the correct indexing in the target engine. Each engine has at least one coordinate space basis to transfer between. For example, in the case of transferring from UNREAL® to UNITY®, positions map X→Z, Z→Y, Y→X, and rotations map as X→Z, Z→Y, Y→X, thus avoiding coordinate space transformation matrix multiplication.

At block 460, the generating device 110b transmits the packet 200 as part of a stream of packets 200 (i.e., streams the packet 200) to the target device 110a. The generating device 110b may use various standards to stream the packets 200 to the target device 110a, including publically available and proprietary standards. In various embodiments, the generating device 110b encrypts all or a portion of the packets 200 included in the stream of packets 200 (either before or after compressing the data included in the packet 200) according to an encryption scheme selected to secure communications between the generating device 110b and the target device 110a. For example, the generating device 110b may apply a stream cipher to the packets 200 via an encryption key for which the target device 110a possesses a decryption key. In various embodiments, the encryption scheme used to encrypt/decrypt the packets 200 may be the same as or different from the encryption scheme used to encrypt/decrypt the user inputs. Method 400 may then return to block 420.

Figure 5:
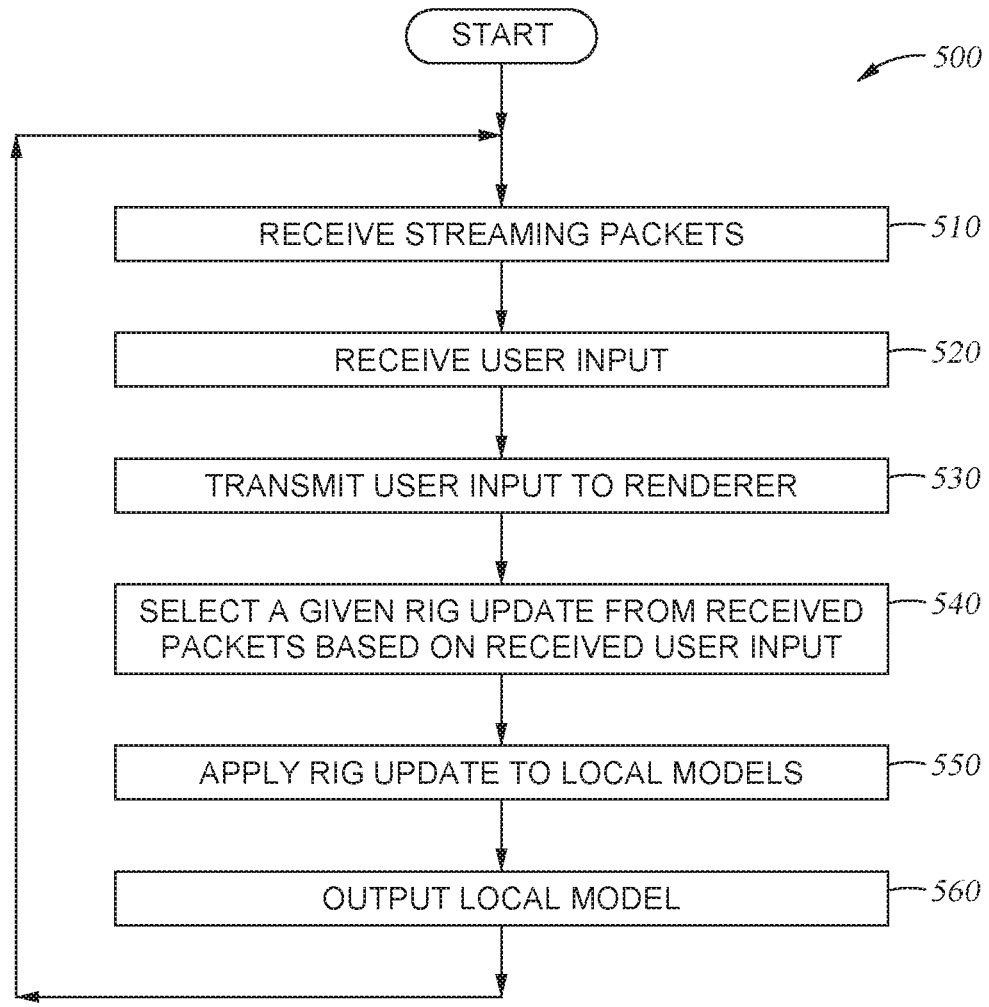
FIG. 5 is a flowchart of a method for interacting with streamed media, according to embodiments of the present disclosure.

FIG. 5 is a flowchart of a method 500 for interacting with streamed media, according to embodiments of the present disclosure. Method 500 begins with block 510, where a target device 110a receives a packet 200 in a stream of packets 200 from a generating device 110b. In various embodiments, where the stream of packets 200 is encrypted, the target device 110a may decrypt some or all of a packet 200 on receipt from the generating device 110b. In a streaming protocol, the target device 110a expects individual packets 200 at a known rate from the generating device 110b. When the target device 110a receives a packet 200 that is malformed (e.g., corrupted) or received outside of the expected time window (or not at all), the target device 110a can drop or ignore that packet 200 in the stream, and select an earlier received packet 200 (per block 540) and the forecasted state data therein that correspond to the times of predictive states 230 that were expected from the dropped/ignored packet 200 for use in a given iteration of method 500.

At block 520, the target device 110a receives a user input, and at block 530 the target device 110a transmits the user input to the generating device 110b. In some embodiments, the user input is received from a peripheral I/O device 190, such as a key or button actuation from a mouse, keyboard, joystick, game controller, etc. In some embodiments, the user input is received from a sensor suite 180, indicating such data as a direction of gaze and location relative to the physical environment. Such user input may be received at discrete times (e.g., when a user presses a button) or at known polling intervals (e.g., reporting the orientation and location of the target device 110a every x milliseconds), and one user input may be combined with another (e.g., a button press and an orientation/location report may be treated as one input) when reporting the user input to the generating device 110b. In some embodiments, the user input is received from a different target device 110a (e.g., a second user in a multi-user virtual environment 145) via the sensor suite 180, directly from the different target device 110a (e.g., via various wireline or wireless communications channels), or indirectly from the generating device 110b. In some embodiments, user inputs that do not affect the virtual environment 145 (e.g., a user input to adjust a local sound volume) may be omitted or filtered from the user inputs reported to the generating device 110b. In various embodiments, the user inputs are transmitted to the generating device 110b in an encrypted format, selected for the generating device 110b to decrypt on receipt.

As used herein, an object (or person) has a location in the environment (e.g., described as X, Y, Z coordinates) and an orientation at a given location based on a given reference feature (e.g., the orientation of a person's nose/eyes/shoulders relative to North). As will be appreciated, a person may change a FOV by head motion, eye motion, or a combination of head and eye motion so that different portions of the environment are visible to that person. The orientation of a user's eyes and head to define the FOV for the user is referred to as the gaze of the user. As will be appreciated, a determination of the direction of the user's gaze may include a determination of the location, pose (e.g., standing, sitting, lying down), and orientation of the user, which may include separate determinations for the position and orientation of the user's head and eyes.

In some embodiments, the generating device 110b uses the FOV for the user to determine a focus of the user's gaze. As will be appreciated, the arc of the FOV can be divided into several segments including peripheral vision, macular vision, paracentral vision, and central vision, which correspond to increasing levels of visual acuity in humans. Additionally, a user may expect to see objects closer in the VR or AR environment to the user with greater acuity. In several embodiments, the generating device 110b identifies one or more objects as the focus of the user's vision based on the gaze of the user intersecting with an object, with greater weight assigned to objects closer to the center of the user's FOV (e.g., the central vision) and closer to the user being the focus of the user relative to objects further from the center of the user's FOV and further from the user. Accordingly, despite appearing in the user's FOV, the target device 110a may display objects located in the user's peripheral vision with less detail than objects in the user's macular vision, and the packets 200 may therefore include less detail or less frequent updates to such objects. Similarly, despite appearing in the user's FOV, the target device 110a may display objects located further away from the user may with less detail than objects closer to user, and the packets 200 may therefore include less detail or less frequent updates to such objects.

At block 540, the target device 110a selects a given rig update from the received packets 200 based on the user input received (per block 520). The target device 110a selects the most current predictive state 230 from the most recently received packet 200 from the branching state 220 corresponding to the user input. In embodiments providing a multi-user virtual environment 145, the user input used to select a branching state 220 may be received from the local user of the target device 110a or a remote user of a different target device 110a interacting with the multi-user virtual environment 145 via a shared generating device 110b.

For example, if user input of A is associated with a first branching state 220a, and user input of B is associated with a second branching state 220b, and the received user input is A, the target device 110a selects the first branching state 220a. Continuing the example, if the first branching state 220a includes a first predictive state 230a associated with time $t_x$, a second predictive state 230b associated with time $t_{x+1}$, and a third predictive state 230c associated with time $t_{x+2}$, the target device 110a selects the first predictive state 230a for use at time $t_x$, as the second predictive state 230b and the third predictive state 230c are associated with later times than the selected time of $t_x$. However, if a second packet 200 in the stream is dropped/ignored/not received, the target device 110a selects the second predictive state 230b as indicated in the earlier packet 200 for use at time $t_{x+1}$. Continuing the example, if a third packet 200 in the stream is received that includes a fourth predictive state 230d associated with time $t_{x+2}$, a fifth predictive state 230e associated with time $t_{x+3}$, etc., within the first branching state 220a, the target device 110a selects the fourth predictive state 230d for use as time tx+2 rather than the third predictive state 230c. Although both the third predictive state 230c and the fourth predictive state 230d are associated with time $t_{x+2}$ within the same branching state 220, because the fourth predictive state 230 is included in a later packet 200 in the stream, the generating device 110b produces the fourth predictive state 230d with greater certainty than the third predictive state 230c, and the target device 110a selects the predictive state 230 for the given time from the most recently received packet 200.

At block 550, the target device 110a applies the rig updates from the selected predictive state 230 (per block 540) to update the local models of virtual objects in the application 144. The rig updates specify various parts of the virtual objects in the local model that are moved to new positions. As time progresses, and as new packets 200 are received (per successive iterations of block 510) and the new predictive states 230 therein are selected (per successive iterations of block 540), the rig updates combine to animate motions and new positions of the virtual objects. In various embodiments, the target device 110a may perform tweening operations for poses of virtual objects between the times indicated in the selected successive predictive states 230 using blend weights specified in the packets.

At block 560, the target device 110a outputs the local model in the application 144 via a display 170, or via transmission to another target device 110a having performed image processing operations on the virtual environment 145. When outputting the local models, the target device 110a applies textures, geometry, material meshes, and lighting conditions to the skeletal rigs in the local application 144 from the local cache 143. Method 500 may continue outputting the local models (per block 560) as additional packets 200, which are received and processed (per block 510-550).

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving, at a generator, user inputs from a target device displaying a presentation of a virtual environment;
   updating, at the generator based on the user inputs, an environmental model of the virtual environment;
   determining network conditions between the generator and the target device;
   generating a packet that includes a forecasted animation set for a virtual object in the updated environmental model, wherein the forecasted animation set comprises a plurality of rig updates for the virtual object for at least two different states of the environmental model, and a number of states comprising the at least two states is based on the network conditions, wherein the number of states comprising the at least two different states is based on at least one of an available bandwidth between the target device and the generator and a latency between the target device and the generator; and
   streaming the packet to the target device.

2. The method of claim 1, wherein the plurality of rig updates are bitwise compressed before streaming the packet to the target device.

3. The method of claim 1, wherein the plurality of rig updates excludes data from a static joint of the virtual object.

4. The method of claim 1, wherein the plurality of rig updates excludes data from a second virtual object that is located outside of a field of view of the virtual environment.

5. The method of claim 1, wherein receiving the user inputs further comprises decrypting the user inputs according to a first encryption scheme selected to secure communications from the target device to the generator; and
   wherein streaming the packet to the target device further comprises encrypting the packet according to a second encryption scheme selected to secure communications from the generator to the target device.

6. The method of claim 1, wherein the forecasted animation set includes a first rig update to display in response to a first user input advancing the presentation to a first state and a second rig update to display in response to a second user input advancing the presentation to a second state, wherein the first state and the second state are branching candidate states for display at one time.

7. The method of claim 6, wherein the forecasted animation set includes a third rig update to display when the presentation advances to a subsequent time from the first state and a fourth rig update to display when the presentation advances to the subsequent time from the second state.

8. A method, comprising:
   receiving, at a target device displaying a virtual environment, a packet stream from a remote generating device, wherein each packet in the packet stream includes a forecasted animation set for a virtual object included in the virtual environment, wherein the forecasted animation set comprises a first rig update for a first state of the virtual environment at a subsequent time and a second rig update for a second state of the virtual environment at the subsequent time;
   receiving, at the target device, a user input to interact with the virtual environment that changes the virtual environment to a given state of the first state and the second state;
   selecting a given rig update from the packet stream associated with the given state;
   applying the given rig update for the virtual object to a local model of the virtual object displayed by the target device;
   outputting, for the subsequent time, the local model on the target device according to the given rig update;
   in response to determining that network conditions for the target device indicate one of an increase or a decrease in at least one of:
      latency for communication with the remote generating device, and
      bandwidth for communication with the remote generating device,
   requesting a corresponding increase or decrease in a number of branching states included in each packet; and
   transmitting the user input to the remote generating device.

9. The method of claim 8, wherein the forecasted animation set further comprises:
   a third rig update for the first state at a plurality of times subsequent to the subsequent time; and
   a fourth rig update for the second state at the plurality of times subsequent to the subsequent time.

10. The method of claim 8, further comprising:
    in response to determining that network conditions for the target device indicate a decrease in latency for communication with the remote generating device, requesting a decrease in a number of branching states included in each packet.

11. The method of claim 8, further comprising:
    in response to determining that network conditions for the target device indicate a decrease in bandwidth for communication with the remote generating device, requesting a decrease in a number of branching states included in each packet.

12. The method of claim 8, wherein the target device outputs the local model via a first graphics engine and the forecasted animation sets are generated by the generator via a second graphics engine different from the first graphics engine, wherein the target device translates the given rig update from a coordinate system used by the second graphics engine to a coordinate system used by the first graphics engine.

13. The method of claim 8, further comprising:
decompressing, at the target device the packet stream.

14. The method of claim 8 wherein the user input includes at least one of:
a button push;
a voice command;
a reorientation of the target device in a physical environment to which the virtual environment is overlaid; and
a relocation of the target device in the physical environment.

15. The method of claim 8, wherein the given rig update excludes positional information for joints of the virtual object that remain static in the virtual environment from a current time to the subsequent time.

16. The method of claim 8, wherein outputting the local model on the target device according to the given rig update further comprises:
applying a texture to the virtual object from a local cache on the target device.

17. A system, comprising:
a generating device, including a generating processor and a generating memory including generating instructions that when performed by the generating processor enable the generating device to perform an animation operation comprising:
generating a plurality of packets, wherein each packet of the plurality of packets includes a forecasted animation set for a virtual object, wherein the forecasted animation set comprises a plurality of rig updates for the virtual object for at least two different states of a virtual environment for one time;
adjusting a number of rig updates in the forecasted animation set of a given packet based on at least one of a latency and an available bandwidth of a network over which the plurality of packets are streamed; and
streaming the plurality of packets via the network;
a target device, in communication with the generating device via the network, the target device including a target processor and a target memory including target instructions that when performed by the target processor enable the target device to perform an operation comprising:
displaying a local model of the virtual environment that includes the virtual object;
receiving the plurality of packets streamed from the generating device;
receiving a user input to interact with the virtual environment;
transmitting the user input to the generating device;
selecting, based on the user input, a given rig update from the plurality of packets received from the generating device; and
updating the local model according to the given rig update for the virtual object; and
wherein the generating device generates the forecasted animation sets via a first graphics engine, and the target device updates the local model via a second graphics engine that is different from the first graphics engine, wherein the target device translates the given rig update from a coordinate system used by the first graphics engine to a coordinate system used by the second graphics engine.

18. The system of claim 17, wherein a number of states included in the at least two states is based on the available bandwidth and a number of times represented by rig updates included in each of the at least two states is based on the latency.

* * * * *